Sept. 25, 1928.
W. F. HOUSLEY ET AL
1,685,548
VALVE SPRING COMPRESSOR
Filed Dec. 9, 1927
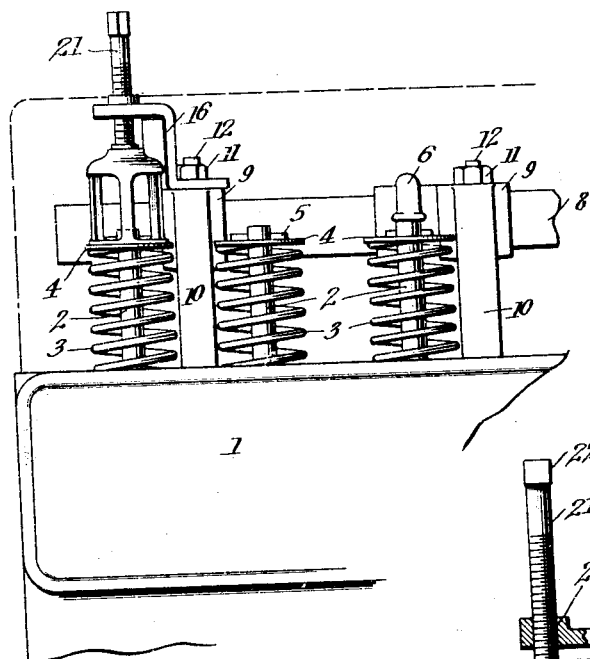
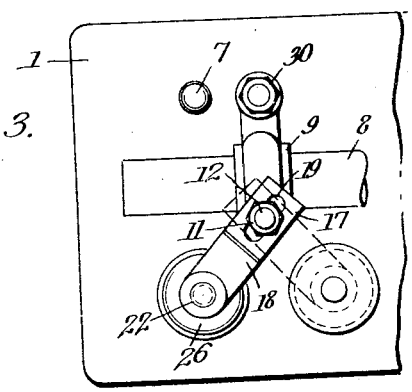
Inventor
William F. Housley
Edward G. Townsend
By Cushman Bryant Darby
Attorneys Patented Sept. 25, 1928.

1,685,548

UNITED STATES PATENT OFFICE.

WILLIAM F. HOUSLEY, OF ANNAPOLIS, AND EDWARD G. TOWNSEND, OF CAMP PAROLE, MARYLAND.

VALVE-SPRING COMPRESSOR.

Application filed December 9, 1927. Serial No. 238,899.

This invention relates to a tool for compressing valve springs of internal combustion engines, and especially that type of engine known as "valve-in-head" engine.

One object of this invention is to provide a tool which will exert sufficient pressure to compress a valve spring and to control the movement of the spring while being compressed and while being returned to its original position, all with a minimum of effort and skill on the part of the operator.

Another object is to construct a tool which will have a thrust or pressure along the longitudinal axis of the spring so that the spring will not be eccentrically loaded at any time, and thus cause the valve spring washer to bind on the valve stem, or cause the spring to slip sideways from under the engaging member with the resultant possibility of a broken spring or injury to the operator.

Another object is to provide a tool which will function without removing the cylinder head. In case of a broken spring, spring washer, or lock pin, it is not desirable to have to remove the cylinder head in order to make the replacement.

A still further object of this invention is to provide a tool which will be of simple and durable construction, economical to manufacture, easy to operate, and compact and light enough to carry in a tool kit.

In carrying out our invention, we provide a frame or bracket, one end of which is adapted to be secured to a member on top of the cylinder head, such as a rocker arm shaft bearing support. This can be readily accomplished through the stud on top of the rocker arm shaft bearing. By securing the frame in this manner, it may be swung over the adjacent valve on one side of the support, and then over the adjacent valve on the other side, and thus two valves may be worked upon without changing the frame from one support to another. The upper part of the frame extends out over the valve stem, and has a screw threaded opening therein with a valve spring washer engaging element on the end of a screw extending through said opening.

The proportions of the frame and the slot contained therein enable the operator to position the screw over the valve stem so that a "straight-line" thrust may be obtained on the valve spring. The use of a screw enables the operator mechanically to control the movement of the valve spring and the screw is self-locking or holding so that both hands of the operator are free once the valve spring has been compressed.

Figure 1 is a side elevation of part of an "overhead valve" motor with the valve compressor in place to engage a valve spring.

Figure 2 is a side elevation of the tool.

Figure 3 is a plan view of the tool in place on a motor.

Figure 4 is a plan sectional view of the valve spring engaging member taken on line 4—4 of Fig. 2.

Referring to the drawings, 1 designates the upper part including the cylinder head of an engine of the "over head valve" type, having the usual valves, valve stems 2, valve springs 3, for holding said valves to their seats, valve spring washers 4 engaging the tops of said springs, and locking pins 5 passing through valve stems 2 and serving with the cooperation of the valve spring washer to lock the spring and stem of each valve. The valves are actuated by rocker arms 6, which in turn are actuated by push rods 7. The rocker arms are mounted on a rocker arm shaft 8 which is supported in bearings 9 on bearing supports 10. The supports in turn are rigidly secured to cylinder head 1 by bolts 30, nuts 11 and studs 12.

The valve spring compressor comprises a substantially Z-shaped frame or bracket which is made up of a vertical portion 16, a lower horizontal flange or foot 17, and an upper horizontal flange or head 18 extending from the other side of the vertical member. The foot 17 is slotted at 19 to allow stud 12 to pass therethrough and be adjusted longitudinally relative thereof. The head 18 has a threaded opening 20 adapted to receive screw 21.

The pressure producing element or screw 21 has a polygonal head 22 adapted to receive a wrench for the purpose of rotating said screw and thereby move it bodily through opening 20 in the head 18. A securing means at the opposite end comprising a reduced neck 23 and a locking washer 24 serves to secure the engaging element 25 to the end of screw 21, so that the end of the screw may freely rotate in the engaging element.

The spring washer engaging element 25 comprises a head 26 adapted to receive the end of screw 21, and a plurality of spaced depending arms 27 attaching head 26 to ring 28. Ring 28 is adapted to engage valve spring washer 4 and has an opening 29 large enough to allow valve stem 2 and locking pin 5 to pass therethrough when valve spring 3 is compressed.

In the operation of our invention, valve rocker arm 6 is removed from its position above the valve as by sliding it along the rocker arm shaft or by removing the complete rocker arm assembly. After the removal of nut 11 the frame 15 is positioned on support 10 so that stud 12 passes through slot 19. Nut 11 is replaced only tight enough to pivotally secure the frame to member 10. The frame is then adjusted so that member 25 engages the valve spring washer on the spring which the operator desires to compress. By turning screw 21 the valve spring is compressed and member 25 passes down over valve stem 2 and lock pin 5. Lock pin 5 is thereby relieved of spring pressure and may be removed through the apertures between the depending arms 27. The spring may be held in this position until the valve is ground and the locking pin replaced, or it may be released and another valve spring compressed.

After completing work upon the first spring, the other spring in the same cylinder may be operated upon by swinging frame 15 on stud 12 as a pivot until member 25 lies directly over the second valve spring washer. In this manner, both the inlet and exhaust valve of any one cylinder may be operated upon without changing the frame from one supporting member to another.

We do not limit our invention to all the details of form and construction hereby described, since we are aware that the same is capable of modification or variation without departure from the spirit of our invention and within the scope of the appended claims.

Obviously, the proportions and shape of the frame 15 may have to be changed to adopt our invention to motors of different manufacture. Head 22 may be equipped with a handle, for instance, by drilling a hole therethrough and putting a slidable bar therein. Valve spring washer engaging element 25 may take a different form such as a C-shaped frame with a bifurcated foot member to engage the washer. The means for securing screw 21 to member 25 may be constructed to include an anti-friction bearing. These and like modifications may be made for commercial or economic reasons without departing from the fundamental ideas embraced in our invention.

We claim:—

1. A valve spring compressor comprising a bracket adapted to be secured to an engine cylinder head while the latter is operatively assembled with the engine block, said bracket having a foot portion formed for attachment to the engine head, a head on said bracket horizontally and vertically spaced from said foot portion, a pressure device carried by said head, and means on said device adapted to compress a valve spring.

2. A valve spring compressor comprising a bracket adapted to be secured to an engine cylinder head while the latter is operatively assembled with the engine block, said bracket having a foot portion formed for attachment to the engine head, a head on said bracket horizontally and vertically spaced from said foot portion, a pressure screw carried by said head, and means on said screw adapted to compress a valve spring.

3. A valve spring compressor comprising a bracket adapted to be secured to an engine cylinder head while the latter is operatively assembled with the engine block, said bracket having a foot portion formed for pivotal attachment to the engine head whereby to be swung from operative association with one valve to another, a head on said bracket horizontally and vertically spaced from said foot portion, a pressure device carried by said head, and means on said device adapted to compress a valve spring.

4. A valve spring compressor comprising a bracket adapted to be secured to an engine cylinder head while the latter is operatively assembled with the engine block, said bracket having a foot portion formed for pivotal attachment to the engine head whereby to be swung from operative association with one valve to another, a head on said bracket horizontally and vertically spaced from said foot portion and extending in the opposite direction from said foot portion, a pressure device carried by said head, and means on said device adapted to compress a valve spring.

5. A valve spring compressor comprising a bracket adapted to be secured to an engine cylinder head while the latter is operatively assembled with the engine block, said bracket having a foot portion formed for attachment to the engine head, a head on said bracket horizontally and vertically spaced from said foot portion and extending in the opposite direction from said foot portion, a pressure device carried by said head, and means on said device adapted to compress a valve spring.

6. A valve spring compressor comprising a bracket adapted to be secured to an engine cylinder head while the latter is operatively assembled with the engine block, said bracket having a foot portion formed for pivotal attachmnt to the engine head, whereby to be swung from operative association with one valve to another, a head on said bracket horizontally and vertically spaced from said foot portion and extending in the opposite direction from said foot portion, a pressure screw carried by said head, and means on said screw adapted to compress a valve spring.

7. A valve spring compressor comprising a bracket having a horizontally disposed foot portion formed with a stud receiving opening, whereby to be secured to the top of a cylinder head, said bracket having a vertically disposed portion extending from said foot and a head carried by said vertically disposed portion, said head being located on the opposite side of said vertical portion from the foot, a pressure device carried by said head, and means on said pressure device adapted to compress a valve spring.

8. A valve spring compressor comprising a bracket having a horizontally disposed foot portion formed with a stud receiving opening, whereby to be secured to a cylinder head while the latter is assembled with an engine block, said bracket having a vertically disposed portion extending from said foot and a head carried by said vertically disposed portion, said head extending horizontally away from said vertically disposed portion, a pressure device carried by said head, and means on said pressure device adapted to compress a valve spring, said pressure device being adapted when adjusted to retain a spring under compression.

9. A valve spring compressor comprising a bracket having a horizontally disposed foot portion formed with a stud receiving opening, whereby to be secured to a cylinder head while the latter is assembled with an engine block, said bracket having a vertically disposed portion extending from said foot and a head carried by said vertically disposed portion, said head extending horizontally in the opposite direction from the foot, a pressure screw carried by said head, and means on said pressure screw adapted to compress a valve spring.

10. A valve spring compressor comprising a bracket having a horizontally disposed foot portion formed with a stud receiving opening, whereby to be secured to a cylinder head while the latter is assembled with an engine block, said bracket having a vertically disposed portion extending from said foot and a head carried by said vertically disposed portion, said head extending horizontally away from said vertically disposed portion, a pressure screw carried by said head, and means on said pressure screw adapted to compress a valve spring, said pressure screw being adapted when adjusted to retain a spring under compression.

11. A valve spring compressor comprising a bracket having means whereby to secure the same above a cylinder head when the latter is assembled with the engine block, an adjustable pressure producing element on said frame, and valve spring compressing means on said pressure element, said element and means being adapted, when adjusted, automatically to hold a spring under compression.

12. A valve spring compressor comprising a bracket having means whereby to secure the same above a cylinder head when the latter is assembled with the engine block, said bracket having a portion adapted to extend above a valve spring, a pressure producing element on said bracket portion to compress a valve spring and means for adjusting said pressure element adapted to hold the same in any adjusted position whereby to automatically hold a spring under compression.

13. A valve spring compressor comprising a bracket having a portion adapted to be positioned immediately adjacent a valve spring, a portion extending laterally from said first mentioned portion and formed for attachment to a fixed part of a cylinder head while the latter is operatively assembled with an engine block, an adjustable pressure exerting device carried by said first portion of the bracket for compressing a spring, said device being adapted to remain set in adjusted position and automatically to hold a spring under compression.

14. A valve spring compressor comprising a bracket having a portion adapted to be positioned immediately adjacent a valve spring, a portion extending laterally from said first mentioned portion and formed for attachment to a fixed part of a cylinder head while the latter is operatively assembled with an engine block, an adjustable pressure exerting device carried by said first portion of the bracket for compressing a spring, said pressure device being adapted when adjusted to retain a spring under compression.

In testimony whereof we have hereunto set our hands.

WILLIAM F. HOUSLEY.
EDWARD G. TOWNSEND.